United States Patent
Sears et al.

(10) Patent No.: US 12,282,507 B2
(45) Date of Patent: Apr. 22, 2025

(54) SYSTEMS AND METHODS FOR AUTOMATED DYNAMICALLY ORDERED PLAYLISTS

(71) Applicant: AUTIO, INC., Santa Barbara, CA (US)

(72) Inventors: Jack W. Sears, Santa Barbara, CA (US); Frank Travieso, Santa Barbara, CA (US)

(73) Assignee: AUTIO, INC., Santa Barbara, CA (US)

(*) Notice: Subject to any disclaimer, the term of this patent is extended or adjusted under 35 U.S.C. 154(b) by 86 days.

(21) Appl. No.: 18/295,135

(22) Filed: Apr. 3, 2023

(65) Prior Publication Data
US 2024/0152551 A1 May 9, 2024

Related U.S. Application Data

(60) Provisional application No. 63/423,462, filed on Nov. 7, 2022.

(51) Int. Cl.
*G06F 16/638* (2019.01)
*H04W 4/021* (2018.01)

(52) U.S. Cl.
CPC .......... *G06F 16/639* (2019.01); *H04W 4/021* (2013.01)

(58) Field of Classification Search
CPC ................ G06F 16/639; H04W 4/021; H04N 21/26258
See application file for complete search history.

(56) References Cited

U.S. PATENT DOCUMENTS

| | | | |
|---|---|---|---|
| 2016/0066038 A1* | 3/2016 | Chesluk | H04N 21/23418 725/13 |
| 2016/0196105 A1* | 7/2016 | Vartakavi | G06F 16/639 700/94 |
| 2019/0007793 A1* | 1/2019 | Liang | G06N 3/084 |
| 2020/0005523 A1* | 1/2020 | Brebner | H04W 4/021 |

* cited by examiner

*Primary Examiner* — Mark D Featherstone
*Assistant Examiner* — Kweku William Halm
(74) *Attorney, Agent, or Firm* — GAVVEL, LLC; Peter Krehbiel (57) ABSTRACT

A system for dynamic playlist generation may comprise a mobile device including a display a processor a tangible, non-transitory electronic memory in electronic communication with the processor, and a set of computer readable code on the non-transitory electronic memory, including a user interface (UI) module executable to display system information and receive user inputs a mapping module executable to request and receive location data from a location data source, to request and receive map data from a map data source, and to integrate the map data and the location data in real time to generate a dynamic map displayable via the UI module, a Field of View (FOV) detector module executable by the processor to determine a current field of view of the dynamic map as displayed on the display via the UI module, and a list generator module.

20 Claims, 7 Drawing Sheets

SYSTEMS AND METHODS FOR AUTOMATED DYNAMICALLY ORDERED PLAYLISTS

CROSS REFERENCE TO RELATED APPLICATIONS

This application claims priority to and benefit of U.S. Provisional Application No. 63/423,462 titled, "SYSTEMS AND METHODS FOR AUTOMATED DYNAMICALLY ORDERED PLAYLISTS" filed, Nov. 7, 2022. All of the contents of the previously identified application are hereby incorporated by reference for any purpose in their entirety.

FIELD

The present disclosure generally relates to systems and methods for dynamic ordering of playlists in mobile environments.

BACKGROUND

Traditionally, user configured playlists are constructed based on user selected files for playback. The user must invest time and effort in constructing the list and, moreover, must manually update the list with new content once existing content is exhausted.

SUMMARY

In various embodiments, systems, methods, and articles of manufacture (collectively, the "system") for automatic dynamically ordered playlists are disclosed. The system may comprise a mobile device including a display a processor a tangible, non-transitory electronic memory in electronic communication with the processor, and a set of computer readable code on the non-transitory electronic memory, including a user interface (UI) module executable to display system information and receive user inputs a mapping module executable to request and receive location data from a location data source, to request and receive map data from a map data source, and to integrate the map data and the location data in real time to generate a dynamic map displayable via the UI module, a Field of View (FOV) detector module executable by the processor to determine a current field of view of the dynamic map as displayed on the display via the UI module, a list generator module, a ranking module comprising a ranking model configured to output a proximity score based on a current position received from the location data source, wherein, in response to execution by the processor, the list generator module executes the FOV detector module to generate flagged elements of a location table comprising location data stored in association with story data and returns the flagged elements to the list generator module, wherein, in response to receiving the flagged elements of the location table, the list generator module automatically inputs each of the flagged elements into the ranking module for further processing, wherein, in response to execution by the processor, the ranking module automatically enters the current position and each of the flagged elements of the location table into the ranking model to generate the proximity score for each of the flagged elements, wherein, in response to generating the proximity scores, the ranking module feeds back each of the proximity scores for each of the flagged elements to the list generator module, wherein, in response to receiving the proximity scores, the list generator module generates a dynamically ordered playlist comprising a plurality of stories, ordered according to their respective proximity score, wherein each of the plurality of stories is associated on a one to one basis with each of the flagged elements of the location table.

In various embodiments, the system further comprises a native application executable on the mobile device, wherein the native application includes the mapping module, the FOV detector module, and the UI module, wherein mobile device comprises the location data source. In various embodiments, the system further comprises a permissions module executable to determine whether electronic communication between the location data source and the native application is enabled and, in response to determining the communication is disabled, call the UI module to generate a prompt to grant location permissions to the native application.

In various embodiments, the system further comprises a stream converter module, wherein the stream converter module is executable by the processor to receive a real time data stream and, in response, transcode the real time data stream into an audio output format compatible for playback via the mobile device. In various embodiments, the stream converter module is executable to compress the real time data stream and store the compressed data stream in a local database of the mobile device. In various embodiments, the list generator module monitors the location data source to determine a change in the current position and, in response to determining the change in the current position, re-executes the FOV detector module and the ranking module to update the dynamically ordered playlist. In various embodiments, the FOV detector module includes a flagging unit executable to flag only those story data with location data on the location table corresponding the current field of view displayed by the dynamic map on the display of the mobile device.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Traditionally, user configured playlists are constructed based on user selected files for playback. The user must invest time and effort in constructing the list and, moreover, must manually update the list with new content once existing content is exhausted. In mobile device applications, the user may be performing tasks which tend to inhibit the user's ability to direct the generation of a new playlist. Traditional playlist methods attempt to mitigate these issues in several ways, for example by repeating the playlist once the end of the list is reached, by shuffling the playlist to provide a different listing experience, by providing a library of playlists from which to easily select and/or triggering a previously generated playlist at the end of the current playlist. While prior art systems typically include the technical problem of user driven playlist generation, the current system provides a technical solution by automating playlist generation. In this regard, the system may enable combinations of user generated playlists and dynamically generated playlists based on determined user preferences and geospatial location. As such, the system may provide time savings and safety enhancements over prior art systems which tend to require user attention to change or create new playlists while performing other activities. Furthermore, by enabling dynamic playlist updates, the system may tend to ensure playlist content is relevant to user interests and location. Benefits of the present disclosure may apply to any suitable mobile streaming media platform.

This process improves the functioning of the computer. For example, by processing and storing data in accordance with the systems and methods described herein the system may reduce network bandwidth and storage overhead. By enabling a dynamically updated playlist, stories (and associated data) are removed from playlists in accordance with user interests and user field of view thereby reducing local storage overhead. Furthermore, by enabling local databases for dynamic playlist generation, system network bandwidth overhead is reduced by reducing or eliminating operations at the system network layer. Finally, user device battery life may be improved by tending to reduce network connectivity requirements thereby allowing connectivity hardware to be idled or powered down.

Figure 1:
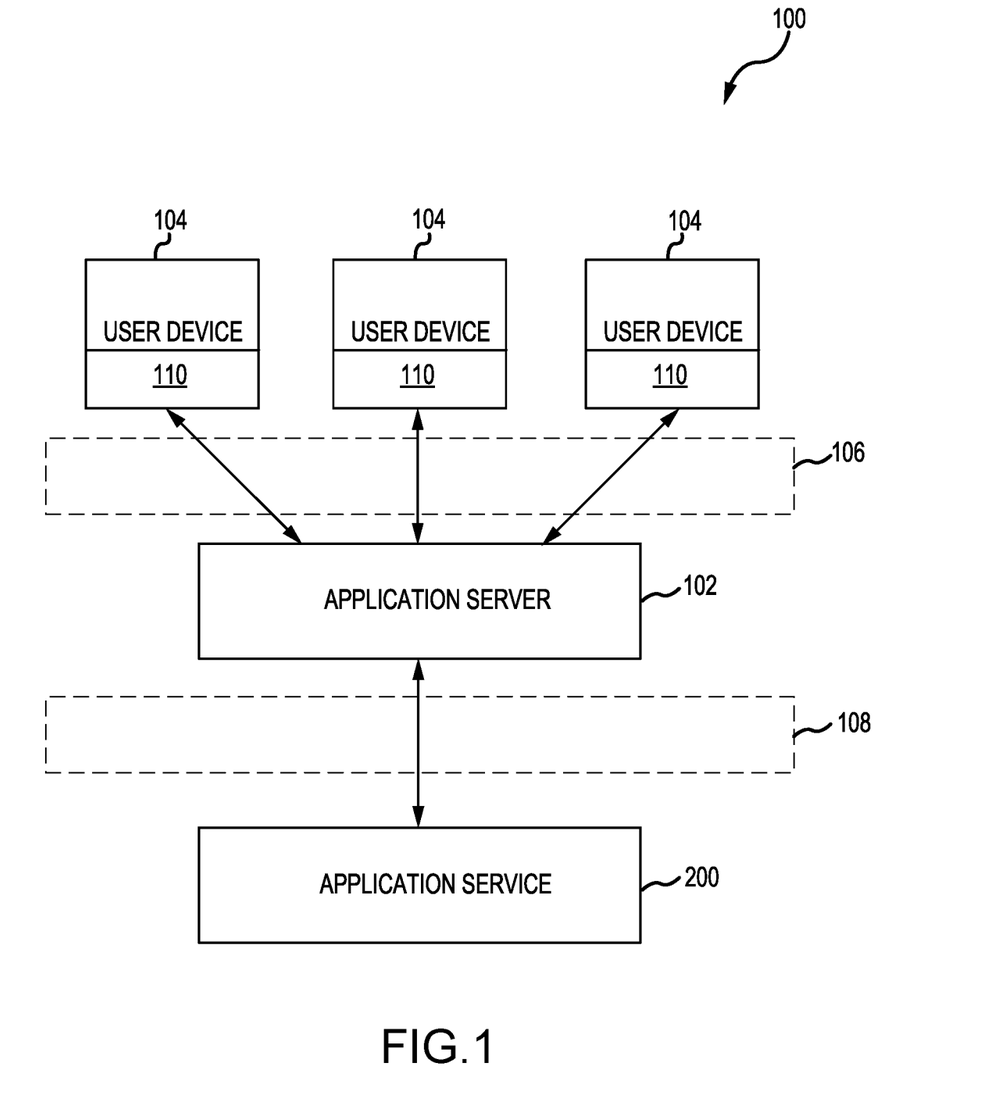
FIG. 1 is a block diagram illustrating various system components of a mobile device based cross platform streaming media platform, in accordance with various embodiments.

In various embodiments, and with reference to FIG. 1, a system 100 may comprise an application server 102, a user device 104, and an application service 200. Any of these components may be outsourced and/or be in communication with the application server 102 and/or application service 200 via a network such as, for example a first network 106 and a second network 108.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, the application server 102 and/or application service 200 may be configured as a central network element or hub to access various systems, engines, and components of system 100. The application server 102 may comprise a network (e.g., network 106), a computer-based system, and/or software components configured to provide an access point to various systems, engines, and components of system 100. The application server 102 may be in operative and/or electronic communication with user devices 104 via the first network 106 and the service 200 via the second network 108. In this regard, the application server 102 may allow communication from the user devices 104 to systems, engines, and components of system 100. In various embodiments, the application server 102 may receive commands and/or metadata from the user devices 104 and may pass replies to the user devices 104.

In various embodiments, application server 102 may include one or more computing devices described above, rack mounted servers, and/or virtual machines providing load balancing, application services, web services, data query services, data transfer services, reverse proxy services, or otherwise facilitating the delivery and receipt of student data across networks (106, 108).

In various embodiments, a user device 104 may comprise software and/or hardware in communication with the system 100 via a network (e.g. network 106) comprising hardware and/or software configured to allow a user, and/or the like, access to the application server 102. The user device may comprise any suitable device that is configured to allow a user to communicate with a network and the system 100. The user device may include, for example, a personal computer, smartphone, in-car entertainment system (e.g., infotainment system), tablet, and/or the like and may allow a user to transmit data and messages to the system 100. In various embodiments, the user device 104 described herein may run a web application or native application configured to communicate with application server 102 and to process data received from the application server 102. A native application 110 may be installed on and executable by a processor of the user device 104 via download, physical media, or a platform specific app store, for example. The native application 110 may utilize the development code base provided for use with the operating system of the particular user device. The native application 110 may be configured to perform system calls and to manipulate the stored and displayed data on the user device 104. In this regard, the native application may be configured for electronic communication with application server 102. A web application may be web browser compatible and written specifically to run on a web browser. The web application may thus be a browser-based application that operates in conjunction with application server 102.

In various embodiments, the native application 110 is executable by the processor on the user device 104 and may be in communication with the application server 102 to support real-time updates. For example, data pertaining to the application service 200 may synchronize across the various user devices 104 used by any number of users interacting with the application server 102 and/or platform 200. In this regard, the application server 102 may serve data from service 200 to each of the user devices 104 and may pass data and commands from the user devices 104 to the service 200. In various embodiments, application server 102 may apply access permissions to restrict the data transmitted between the networks (106, 108) and/or the various components of system 100. Users may be authenticated on the native application 110, for example, via a user name, password, dual factor authentication, private cryptographic key, one-time password, security question, biometrics, or other suitable authentication techniques know to those skilled in the art.

Figure 2:
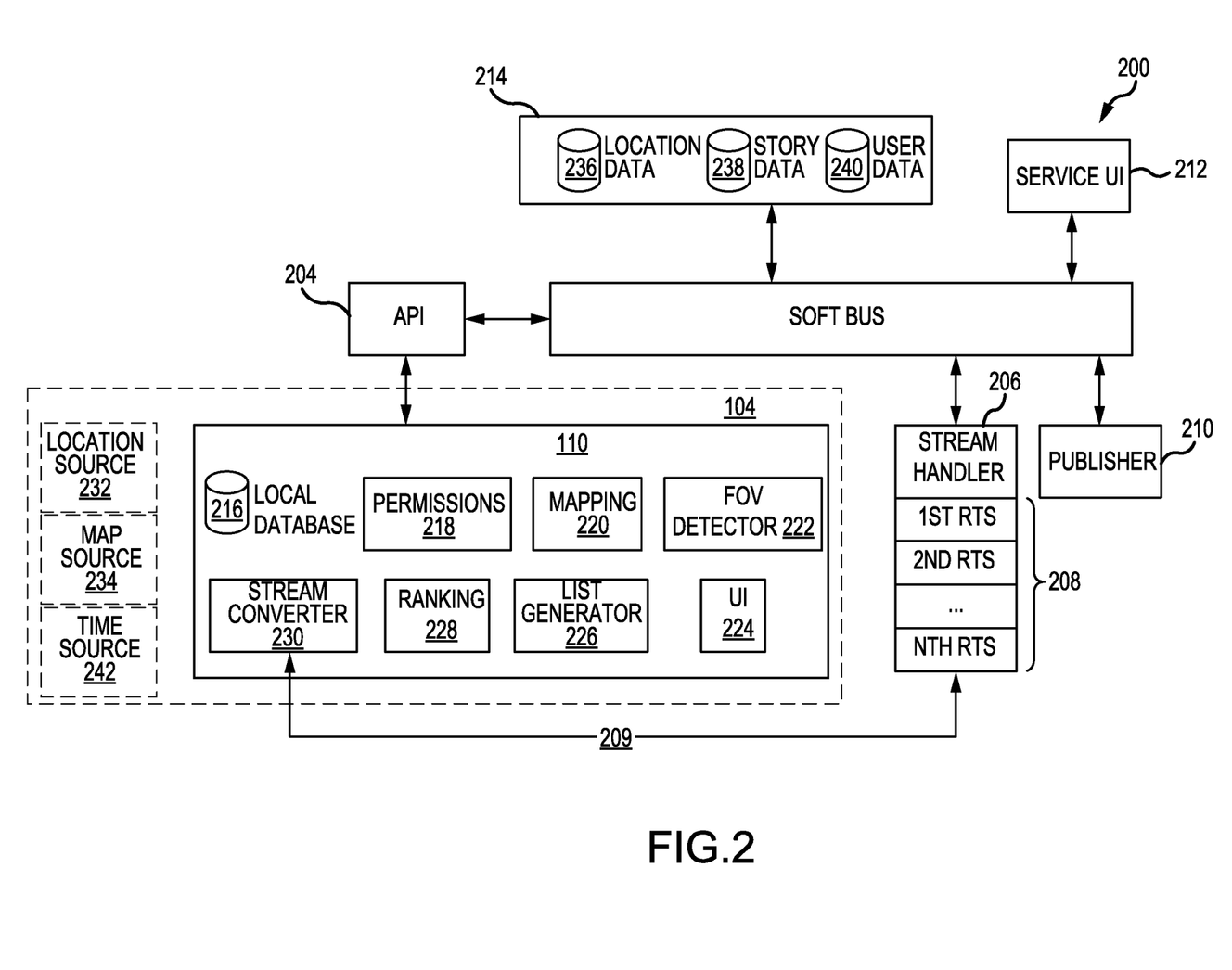
FIG. 2 illustrates an application service of a streaming media platform, in accordance with various embodiments.

With additional reference to FIG. 2, a block diagram of a service 200 of system 100 is illustrated in accordance with various embodiments. Service 200 may comprise a software bus architecture 202, an application programming interface (i.e., API module 204), a stream handler 206 module, a publisher 210 module, a service user interface 212 module, a service database 214 module, and a local database 216 module, a permissions module 218, a mapping module 220, a Field of View (FOV) detector 222 module, a mobile user interface (UI) 224 module, a list generator module 226, a ranking module 228, and a stream converter 230 module.

In various embodiments, API module 204 may be configured to provide a programmatic interface to any of the set of system 100 or service 200 services, components, modules, and/or engines. The API module 204 may be configured for communication between the service 200 and the native application 110 to enable electronic communication between the modules of the native application 110 and of the application service 200.

In various embodiments, the service database module 214 may include any number of data structures or data elements such as, for example, location data 236, story data 238, and user data 240. User data 240 may comprise elements of information relate to platform users and stored in association therewith. User data 240 may comprise, for example, a username, password, user ID, payment information (e.g., credit card number, bank account information), phone number, email address, street address, biometric data (e.g., fingerprint data, faceprint data, voiceprint data), user account settings and/or preferences, and/or the like. Story data 238 may comprise a plurality of story files each including audio data (such as, for example, a narrated vignette) stored in association with a metadata set related to the story file. In various embodiments each story file may be associated on a one-to-one basis with a story ID unique to the story file. The story file metadata may include, for example, elements such as title, state, category, producer name, narrator name, description, published date and/or the like.

In various embodiments, the title element may be a text field defining the title of the story. The state element may define a geopolitical boundary associated with the story file such as, for example, a state or administrative subdivision (e.g., Arizona, Texas, Bavaria, Normandie, Trenton-South Tyrol, etc.). The category element may define categorical and topic information related to the story file such as, for example, Politics, War History, Indigenous Stories, People, Landmarks, Geography, Architecture, Culture, Colorful Characters, Local Insights, Natural Wonders, Sports, music, Special Places of Interest, and/or the like. The producer name element may be a text element defining the name of the producer of the audio file. The narrator name element may comprise a text element defining the name of the narrator of the audio file. The description element may be a text string defining a short description of the content of the audio file. The published date may be a date element defining the date the story was made available via the application service.

In various embodiments, location data 236 may comprise tables of location information stored in association with the story data 238. The location information may comprise geodetic datum information such as, for example, latitude and longitude or World Geodetic System (WGS) 84 coordinate information. In this regard, each story of the plurality of stories may be associated with a geographic area and/or particular point on, above, or below the surface of the Earth.

In various embodiments the stream handler module 206 may be configured to generate one or more real time data streams 208 (e.g., a first real time stream (RTS), a second RTS, a third RTS . . . an Nth RTS) based on the story data 238 from the service database 214. The stream handler module may be executable by a processor of the application server to encode the data in a compressed streaming format for transmission to the native application 110 via one or more data channels 209 and/or the API module 204. In various embodiments, the stream converter 230 module may be executable by the mobile device processor to receive the real time data streams 208 and, in response, to transcode the streams into an audio output format compatible for playback via the mobile device 104. In various embodiments, the stream converter module 230 may be executable to further compress the real time data streams 208 for storage in the local database 216. In this regard the story data may be recovered locally by the mobile device 104 in the event the electronic communication between the native application 110 and the application service 200 is terminated.

In various embodiments, the UI module 224 is executable to display system 100 information to system users via a display of the mobile device 104. The UI module 224 may be executable to receive user input such as, for example, text from a keypad or gestural/touch feedback from a touch screen display. For example, the UI module 224 may display soft buttons on a touch screen display of the user device and in response to a user interaction (such as a touch) the UI module may generate signals and/or commands for further processing by the native application 110.

Figure 3:
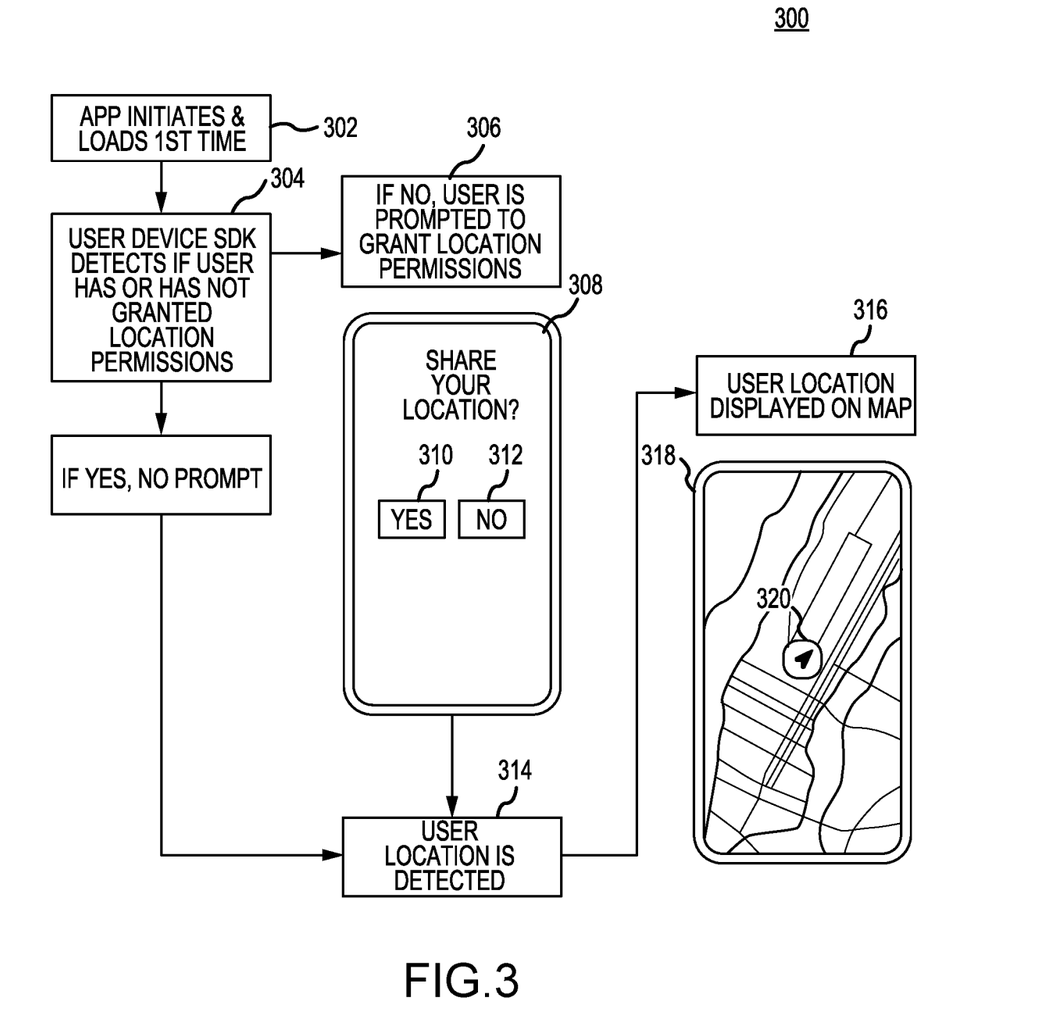
FIG. 3 illustrates a permissions process, in accordance with various embodiments.

With additional reference to FIG. 3 a permissions process 300 of system 100 is illustrated in accordance with various embodiments. At 302, the native application 110 is loaded and executed by the mobile device processor. At 304 the permissions module 218 is executed. The permissions module 218 is executable to determine whether electronic communication between the native application 110 and a location data source 232 (aboard the mobile device) is established. Where communication with the location data source is established, the process progresses to step 314. If no communication to the location data source 232 is established, the permissions module 218 may call the UI module 224 to generate a prompt to grant location permissions (step 306). In response to the call, the UI module 224 may present a location prompt 308 via the touch screen of the user device 104. In various embodiments, the prompt may include an accept button 310 (marked 'yes') and a reject button 312 (marked no'). In response to receiving a user interaction with the reject button 312 the process ends and the native application 110 may be terminated. In response to receiving a user interaction with the accept button 310, the permissions module 218 establishes electronic communication with the location data source 232.

In response to establishing electronic communication with the location data source 232, mapping module 220 is executed at 314. In various embodiments, the mapping module is executable to request and receive location data from the location data source 232. The mapping module may be executable to request and receive map data from a map data source 234. The mapping module 220 may integrate the map data and the location data in real time to generate dynamic map data (step 316). The mapping module may pass the dynamic map data to the UI module 224 for display as a dynamic map 318. In various embodiments, the dynamic map 318 may be scalable with a field of view centered on the user's position 320. In various embodiments, the field of view may be scaled in response to receiving a gesture interaction. For example, a user may touch the dynamic map with a thumb and a pointer finger simultaneously and draw both fingers together along the surface of the dynamic map in a pinching motion (i.e., the 'pinch' gesture). Alternatively, the user may touch the dynamic map with the thumb and the pointer finger simultaneously and push both fingers apart along the surface of the dynamic map in an opening motion (i.e., the 'open' gesture). In response to receiving the pinch gesture via the UI module 224 the mapping module 220 may reduce the displayed field of view. In response to receiving the open gesture via the UI module 224 the mapping module 220 may expand the displayed field of view. In various embodiments, the user may touch the dynamic map at a single point with the pointer finger and drag the pointer finger across the dynamic map (i.e. the 'drag' gesture). In response to receiving the drag gesture via the UI module 224, the mapping module 220 may shift the field of view away from the user's position 320 along a path defined by the course of contact across the dynamic map in the drag gesture. It will be appreciated that the field of view of the dynamic map need not be centered on the users position 320. Indeed the field of view may be offset from the users position 320 such that the users position 320 is no longer displayed.

Figure 4:
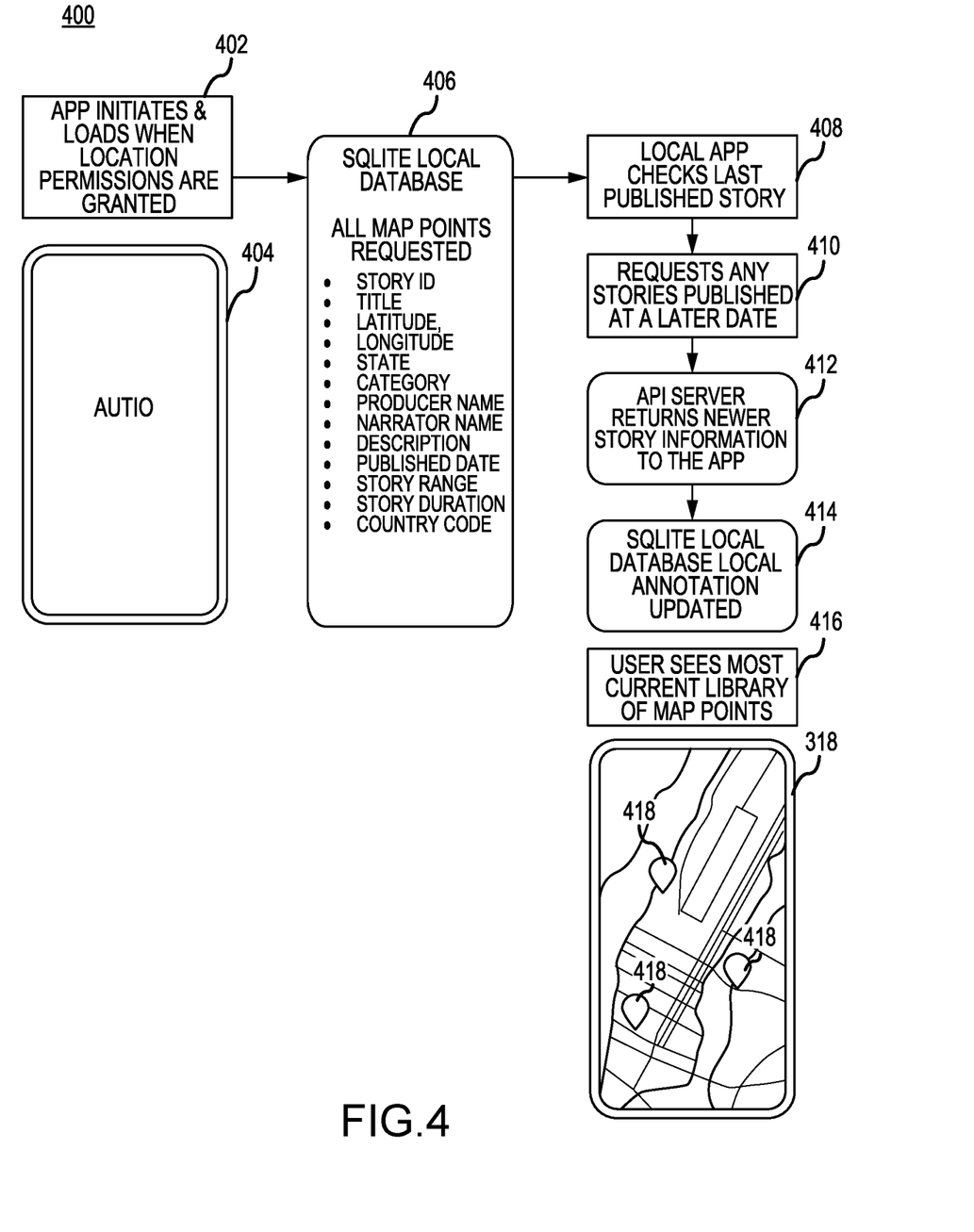
FIG. 4 illustrates a story synchronization process, in accordance with various embodiments.

In various embodiments and with additional reference to FIG. 4, a story synchronization process 400 of system 100 is illustrated. At 402 the native application 110 is loaded and executed with electronic communication to the location data source 232 enabled. In response to loading and execution in this state, the UI module 224 may display a loading splash screen 404. At 406 the native application 110 reads the story data and the location data stored in the local database 216. The native application 110 includes a published date comparator executable to determine a last published story based on the published date element of the story data in the local database 216 and a current date provided by a system time and/or date source 242. At 408 the published date comparator is executed to return the last published story. At 410 the native application passes the last published story to the API module 204 for further processing by the application service. In response to receiving the last published story, the publisher 210 calls the service database 214 and requests stories which have been recorded to the service database 214 after the last published story.

At 412 the publisher 210 assembles the metadata of stories which have been recorded to the service database 214 after the last published story into a story update package and passes the story update package to the API module 204 for distribution to the native application 110. In response to receiving the story update package, the local database 216 automatically adds the metadata associated with the new stories to the local story data (step 414).

In various embodiments, in response to receiving the story update package, the mapping module 220 may execute the FOV detector module 222 (step 416). The FOV detector module is executable to determine the current field of view of the dynamic map displayed via the UI module 224. In response to determining the current field of view, the FOV detector 222 may generate a location table comprising the location data associated with the each of the stories from the local database 216. The FOV detector may include a FOV flagging unit executable to flag only those stories with location data corresponding to the current field of view (as displayed on a display of the mobile device by the UI module). The FOV detector 222 may pass the flagged elements of the location table to the mapping module 220. The mapping module is executable to load and integrate the location data of the flagged elements into the dynamic map data as a plurality of story locations 418 which are displayed via the UI module 224 on the dynamic map 318.

Figure 5:
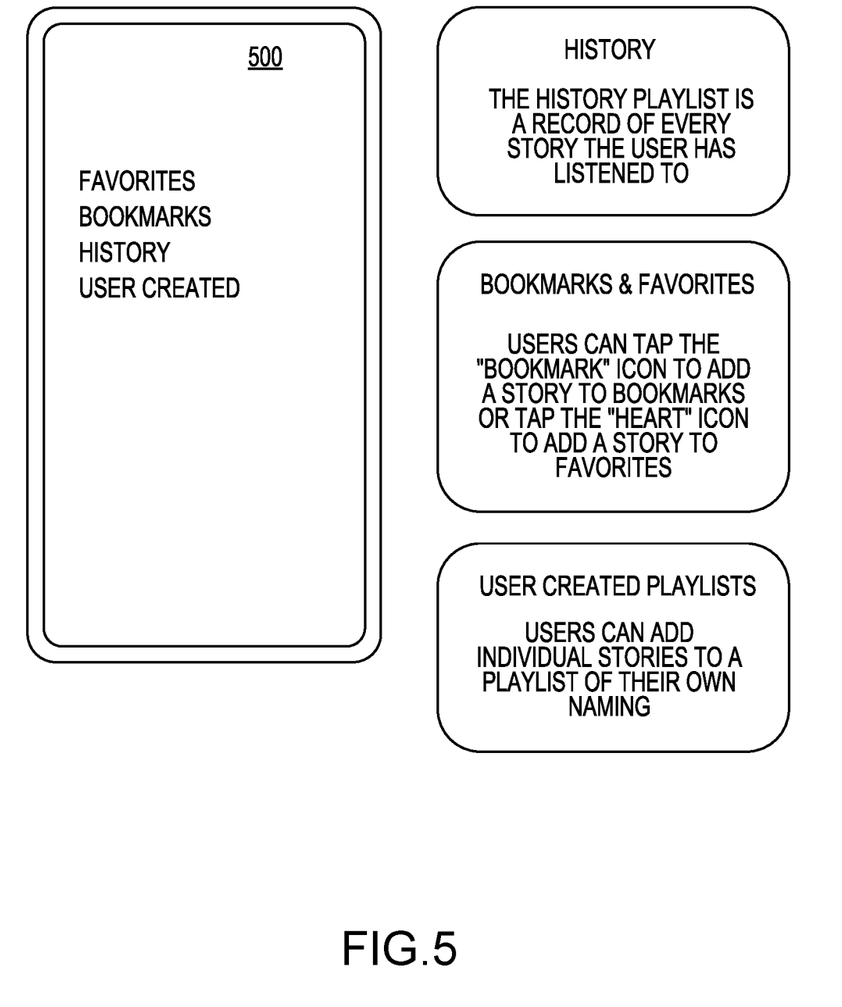
FIG. 5 illustrates a playlists page of a streaming media platform, in accordance with various embodiments.

With additional reference to FIG. 5 a playlists page 500 of system 100 is illustrated as displayed via the user device 104 in accordance with various embodiments. The list generator module 226 may be executable to generate one or more playlists such as, for example, a user created playlist, a history playlist, a favorites playlist, and a bookmarked playlist. The list generator module 226 may include a playlist flagging unit operable to receive user feedback from the UI module 225. A user may generate user feedback by select one or more stories from the dynamic map 318. The UI module 225 may pass the feedback to the list generator module 226 for further processing. For example, the user may touch one or more of the story locations and, in response, the playlist flagging unit may flag the story associated therewith as 'user created'. Based on the 'user created' flag, the list generator 226 may generate the user created playlist comprising the associated flagged stories. The list generator 226 may save the user created playlist to the local database 216.

In various embodiments, the list generator module 225 may receive feedback from the stream converter module 230. The stream converter module 230 may provide feedback comprising confirmation that a story has been played on the mobile device 104 (i.e. playback confirmations). The list generator module 230 may input the playback confirmations into the playlist flagging unit which is executable to flag as 'played' each story associated with the playback confirmations. Based on the 'played' flag, the list generator module 226 generates the history playlist comprising the associated flagged stories. The history playlist may be saved in the local database 216 as playlist data. In like regard, based on a user feedback comprising an interaction with a bookmark soft button or a 'heart' soft button, the playlist flagging unit may flag the respectively associated story with a 'bookmarked' flag and/or a 'favorites' flag. The list generator module 226 may then generate corresponding bookmarks and favorites playlists based on the associated flags.

Figure 6:
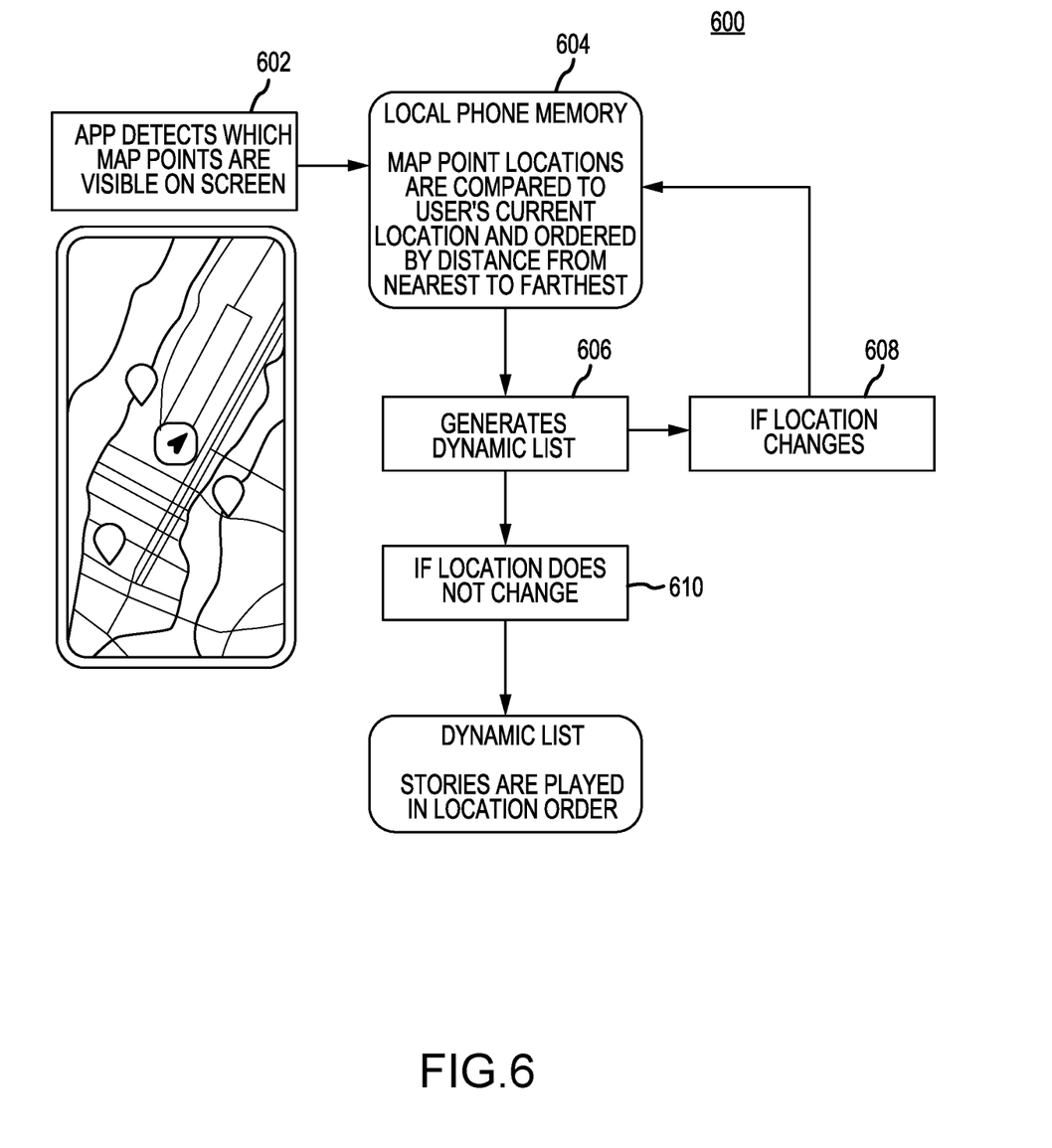
FIG. 6 illustrates a process for generating a dynamically ordered playlist, in accordance with various embodiments.

With additional reference to FIG. 6, a process 600 for generating a dynamically ordered playlist is illustrated in accordance with various embodiments. At 602 the list generator module 226 executes the FOV detector 222 to generate the flagged elements of the location table (recall FIG. 3 step 416). The list generator module 226 automatically inputs the flagged elements of the location table into the ranking module 228. At 604 the ranking module 228 is executable to rank the flagged elements of the location table based on the user's position 320 (current position as received from the location source 232). The raking module 228 comprises a ranking model configured to output a proximity score based on a proximity to the current position. The ranking module 228 automatically enters the current position reported by the location source 232 and the flagged elements of the location table generated by the FOV detector 222 into the ranking model to assign the proximity sore for each of the story locations.

The proximity score is fed back to the list generator module 222 which generates a dynamically ordered playlist comprising the stories associated with the story locations processed by the ranking module (i.e., those stories associated with the flagged elements of the location table) and ordered according to the proximity sore (step 606). In various embodiments, the proximity score may be selected such that the stories of the dynamically ordered playlist are ordered by story location from nearest to (most proximate) the current location to farthest from (least proximate) the current location. At 606 the list generator module 222 monitors the location source 232 to determine a change in the current position. In response to detecting the change in the current position, the list generator module 222 re-executes the FOV detector 222 and the ranking module 228 and updates the dynamically ordered playlist. In this regard, the order of stories in the dynamically ordered playlist will shift up or down in the dynamically ordered playlist based on changes in the current position (i.e., a change in rank based on the changed in proximity score).

Furthermore, it will be appreciated that stories may be added or removed from the dynamically ordered playlist by the list generator module 222 based on changes in the current field of view as the FOV flagging unit will drop the flags for stories with location data no longer corresponding to the current field of view. For example, as discussed above, in response to receiving the open gesture via the UI module 224 the mapping module 220 may expand the displayed field of view and stories corresponding to the new story locations displayed on the dynamic map will be added to the dynamically ordered playlist. In another example, the pinch gesture may reduce the field of view and stories corresponding to the story locations removed from the dynamic map will be removed from the dynamically ordered playlist. In another example, in response to the drag gesture the field of view may shift such that some stories are added and some are removed from the dynamically ordered playlist. In this regard, the dynamically ordered playlist is responsive dynamically to both current position and field of view. At 610, where the list generator module 222 does not detect a change in the current position, the dynamically ordered playlist is saved to the local database 216 and made available to play.

Figure 7:
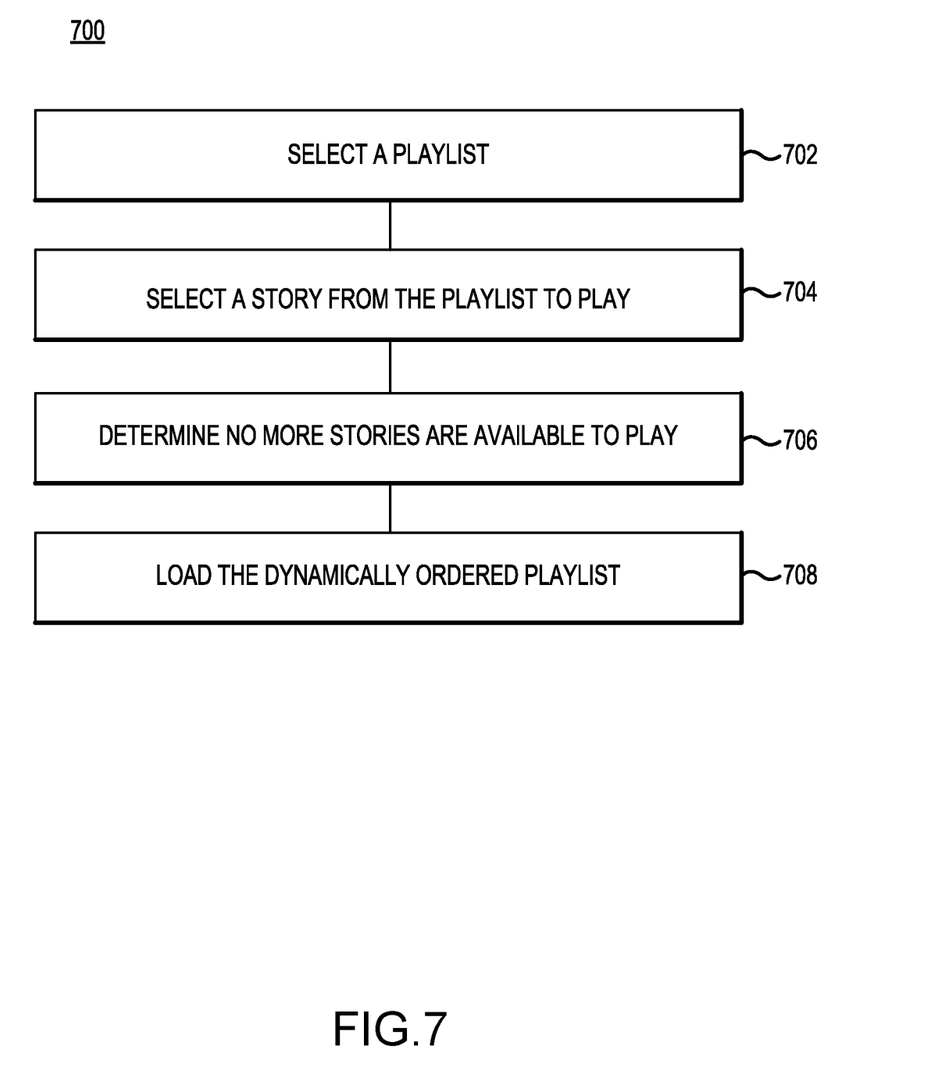
FIG. 7 illustrates a process for playing a dynamically ordered playlist, in accordance with various embodiments.

In various embodiments and with additional reference to FIG. 7, a method 700 of playing a dynamically ordered playlist is illustrated. The system may select a playlist to play (step 702). For example, the user may access playlists page 500 and interact with one of the favorites, bookmarks, history, or user created playlists soft buttons. In response to the user interaction with the soft button, the system may display a list of the associated playlists. The user may touch one of the list of associated playlists and the system may select the corresponding playlist from the local database 216. The system may pass the playlist selection to the stream converter module 230 for further processing. The system may select a story from the playlist to play (step 704). For example, the system may display each of the stories in the playlist and the user may touch one of the stories. In response to receiving the user interaction, the system may select the corresponding story for playback. The stream converter module 230 may be executed to begin processing the audio data corresponding to the story and may progress sequentially through each story on the playlist. The stream converter module 230 may determine that there are no more stories in the selected playlist to play (step 706). For example, the stream converter module 240 may have reached the end of the playlist or may have generated a playback confirmation for each story on the selected playlist. In response to determining no more stories are available to be played in the selected playlist, the stream converter module 230 may automatically search the local database 216 for the dynamically ordered playlist. The stream converter module 230 automatically loads the dynamically ordered playlist if found or may execute the list generator module 226 to generate the dynamically ordered playlist if not found. In response to loading the dynamically ordered playlist, the stream converter module 230 automatically begins processing the audio data corresponding to the stories of the dynamically ordered playlist.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

Referring now to FIGs. TBD, the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGs. TBD, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE CHROME' software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links. The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 ® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, instrument, contract details, issuer, buyer, seller, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuif ten to fall outside the scope of patentable subject matter under 35 U.S.C. § 101.

The disclosure and claims do not describe only a particular outcome of automated strategy generation, but the disclosure and claims include specific rules for implementing the outcome of dynamically ordered playlists and that render information into a specific format that is then used and applied to create the desired results of automated dynamically ordered playlists, as set forth in McRO, Inc. v. Bandai Namco Games America Inc. (Fed. Cir. case number 15-1080, Sep. 13, 2016). In other words, the outcome of automated dynamically ordered playlists can be performed by many different types of rules and combinations of rules, and this disclosure includes various embodiments with specific rules. While the absence of complete preemption may not guarantee that a claim is eligible, the disclosure does not sufficiently preempt the field of automated dynamically ordered playlists at all. The disclosure acts to narrow, confine, and otherwise tie down the disclosure so as not to cover the general abstract idea of just automated dynamically ordered playlists. Significantly, other systems and methods exist for automated dynamically ordered playlists, so it would be inappropriate to assert that the claimed invention preempts the field or monopolizes the basic tools of automated dynamically ordered playlists. In other words, the disclosure will not prevent others from automated dynamically ordered playlists, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or to just "apply it" to an abstract process. The disclosure and claims may also be directed to improvements to software with a specific implementation of a solution to a problem in the software arts.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for dynamic playlist generation, comprising: a mobile device including a display; a processor; a tangible, non-transitory electronic memory in electronic communication with the processor, and a set of computer readable code on the non-transitory electronic memory, including: a user interface (UI) module executable to display system information and receive user inputs; a mapping module executable to request and receive location data from a location data source, to request and receive map data from a map data source, and to integrate the map data and the location data in real time to generate a dynamic map displayable via the UI module; a Field of View (FOV) detector module executable by the processor to determine a current field of view of the dynamic mapas displayed on the display via the UI module; a list generator module; a ranking module comprising a ranking model configured to output a proximity score based on a current position received from the location data source; wherein, in response to execution by the processor, the list generator module executes the FOV detector module to generate flagged elements of a location table comprising location data stored in association with story data and returns the flagged elements to the list generator module; wherein, in response to receiving the flagged elements of the location table, the list generator module automatically inputs each of the flagged elements into the ranking module for further processing; wherein, in response to execution by the processor, the ranking module automatically enters the current position and each of the flagged elements of the location table into the ranking model to generate the proximity score for each of the flagged elements, wherein, in response to generating the proximity scores, the ranking module feeds back each of the proximity scores for each of the flagged elements to the list generator module; wherein, in response to receiving the proximity scores, the list generator module generates a dynamically ordered playlist comprising a plurality of stories, ordered according to their respective proximity score, wherein each of the plurality of stories is associated on a one to one basis with each of the flagged elements of the location table.

2. The system of claim 1, further comprising a native application executable on the mobile device, wherein the native application includes the mapping module, the FOV detector module, and the UI module, wherein mobile device comprises the location data source.

3. The system of claim 2, further comprising a permissions module executable to determine whether electronic communication between the location data source and the native application is enabled and, in response to determining the communication is disabled, call the UI module to generate a prompt to grant location permissions to the native application.

4. The system of claim 1 further comprising a stream converter module, wherein the stream converter module is executable by the processor to receive a real time data stream and, in response, transcode the real time data stream into an audio output format compatible for playback via the mobile device.

5. The system of claim 4, wherein the stream converter module is executable to compress the real time data stream and store the compressed data stream in a local database of the mobile device.

6. The system of claim 1, wherein the list generator module monitors the location data source to determine a change in the current position and, in response to determining the change in the current position, re-executes the FOV detector module and the ranking module to update the dynamically ordered playlist.

7. The system of claim 1, wherein the FOV detector module includes a flagging unit executable to flag only those story data with location data on the location table corresponding the current field of view displayed by the dynamic map on the display of the mobile device.

8. A method for dynamic playlist generation, comprising: executing, by a processor a list generator module, wherein in response to execution by the processor, the list generator module executes a Field of View (FOV) detector module to 88411.0010031 generate flagged elements of a location table comprising location data stored in association with story data; returning, by the processor and via the FOV detector module, the flagged elements to the list generator module; automatically inputting, by the list generator module and in response to receiving the flagged elements of the location table, each of the flagged elements into a ranking module for further processing; executing, by the processor the ranking module, wherein the ranking module automatically enters a current position and each of the flagged elements of the location table into a ranking model; generating, by the processor and via the ranking module, a proximity score for each of the flagged elements of the location table wherein, in response to generating the proximity scores, the ranking module feeds back each of the proximity scores for each of the flagged elements to the list generator module; generating, by the processor and via the list generator module, in response to receiving the proximity scores, a dynamically ordered playlist comprising a plurality of stories, ordered according to their respective proximity score, wherein each of the plurality of stories is associated on a one to one basis with each of the flagged elements of the location table.

9. The method of claim 8, wherein the FOV detector module is executable by the processor to determine a current field of view of a dynamic map as displayed on a display of a mobile device via a user interface (UI) module executable by the processor to display system information and receive user inputs.

10. The method of claim 9, wherein the mapping module executable by the processor to request and receive location data from a location data source, to request and receive map data from a map data source, and to integrate the map data and the location data in real time to generate the dynamic map displayable via the UI module.

11. The method of claim 10, wherein the list generator module monitors the location data source to determine a change in the current position and, in response to determining the change in the current position, re-executes the FOV detector module and the ranking module to update the dynamically ordered playlist.

12. The method of claim 11, wherein the FOV detector module includes a flagging unit executable to flag only those story data with location data on the location table corresponding the current field of view displayed by the dynamic map on the display of the mobile device.

13. The method of claim 12, further comprising executing, by the processor, a stream converter module, wherein the stream converter module is executable by the processor to receive a realtime data stream and, in response, transcode the real time data stream into an audio output format compatible for playback via the mobile device.

14. The method of claim 13, wherein the stream converter module is executable by the processor to compress the real time data stream and store the compressed data stream in a local database of the mobile device.

15. An article of manufacture including a non-transitory, tangible computer readable storage medium having instructions stored thereon that, in response to execution by a processor, cause the processor to perform operations comprising: executing, by the processor a list generator module, wherein in response to execution by the processor, the list generator module executes a Field of View (FOV) detector module to generate flagged elements of a location table comprising location data stored in association with story data; returning, by the processor and via the FOV detector module, the flagged elements to the list generator module; automatically inputting, by the list generator module and in response to receiving the flagged elements of the location table, each of the flagged elements into a ranking module for further processing; executing, by the processor the ranking module, wherein the ranking module automatically enters a current position and each of the flagged elements of the location table into a ranking model; generating, by the processor and via the ranking module, a proximity score for each of the flagged elements of the location table wherein, in response to generating the proximity scores, the ranking module feeds back each of the proximity scores for each of the flagged elements to the list generator module; generating, by the processor and via the list generator module, in response to receiving the proximity scores, a dynamically ordered playlist comprising a plurality of stories, ordered according to their respective proximity score, wherein each of the plurality of stories is associated on a one to one basis with each of the flagged elements of the location table.

16. The article of manufacture of claim 15, wherein the FOV detector module is executable by the processor to determine a current field of view of a dynamic map as displayed on a display of a mobile device via a user interface (UI) module executable by the processor to display system information and receive user inputs.

17. The article of manufacture of claim 16, wherein the mapping module executable by the processor to request and receive location data from a location data source, to request and receive map data from a map data source, and to integrate the map data and the location data in realtime to generate the dynamic map displayable via the Ul module.

18. The article of manufacture of claim 17, wherein the list generator module monitors the location data source to determine a change in the current position and, in response to determining the change in the current position, re-executes the FOV detector module and the ranking module to update the dynamically ordered playlist.

19. The article of manufacture of claim 18, wherein the FOV detector module includes a flagging unit executable by the processor to flag only those story data with location data on the location table corresponding the current field of view displayed by the dynamic map on the display of the mobile device.

20. The article of manufacture of claim 19, wherein the operations further comprise executing, by the processor, a stream converter module, wherein the stream converter module is executable by the processor to receive a real time data stream and, in response, transcode the real time data stream into an audio output format compatible for playback via the mobile device.

* * * * *